Figure 2:
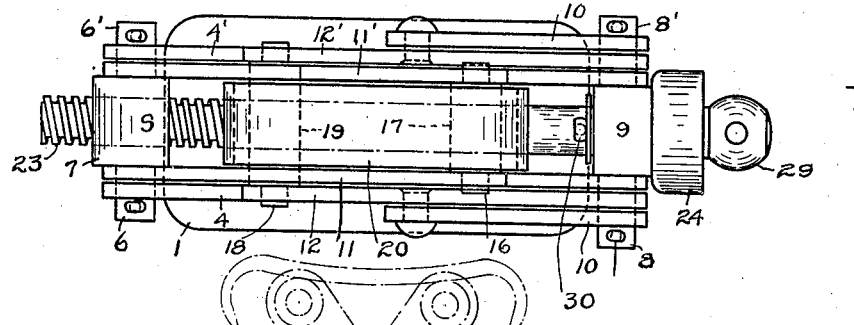

March 16, 1926.

E. W. CONRAD

LIFTING JACK

Filed August 21, 1925

1,576,721

INVENTOR.
Earl W. Conrad,
BY
ATTORNEYS.

Patented Mar. 16, 1926.

1,576,721

UNITED STATES PATENT OFFICE.

EARL W. CONRAD, OF WARSAW, INDIANA.

LIFTING JACK.

Application filed August 21, 1925. Serial No. 51,588.

*To all whom it may concern:*

Be it known that I, EARL W. CONRAD, a citizen of the United States, residing at Warsaw, in the county of Kosciusko and State of Indiana, have invented new and useful Improvements in Lifting Jacks, of which the following is a specification.

The invention relates to jacks and its object is to provide an efficient, durable, substantial and rapidly operating jack.

The invention consists in the novel combination and arrangement of parts hereinafter described and illustrated in the drawings, in which drawings—

Figure 1:
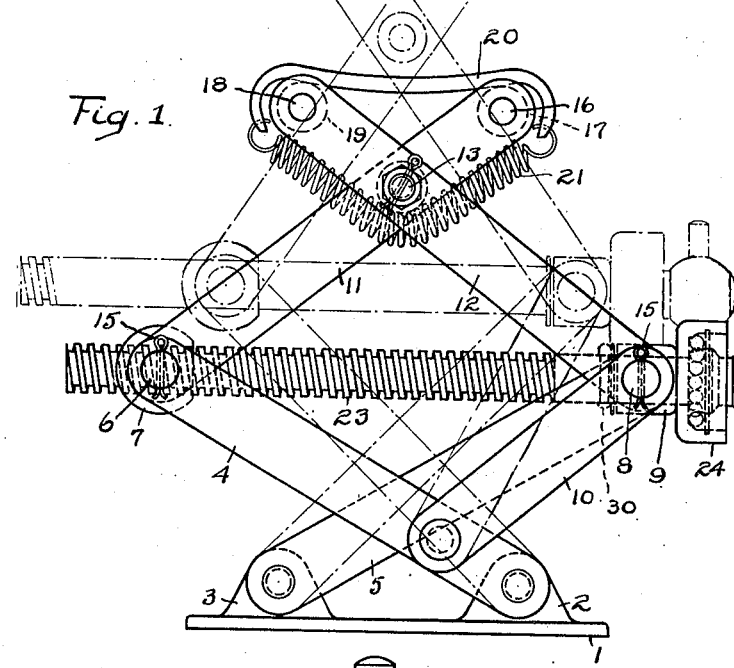
Figure 3:
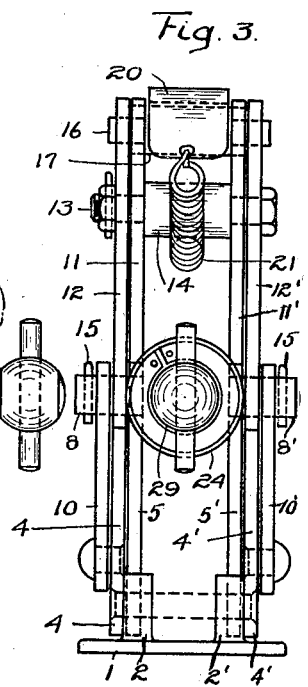
Figure 4:
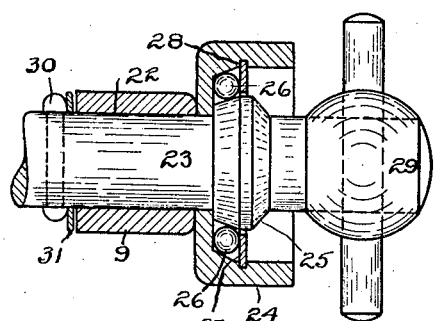

Figure 1 is a side elevational view of a device embodying the invention; Fig. 2 a plan view of the same; Fig. 3 an end view of the same and Fig. 4 a detail view of the thrust bearing for the screw.

Referring to the illustrative embodiment of the invention, 1 is the base having on its upper side two pairs of lugs 2, 2 and 3, the other lug of the pair 3 not being shown. The members of each pair are spaced transversely and the pairs are properly spaced from each other lengthwise of the base. Two links 4, 4' are pivoted at their lower ends to the lugs 2, 2' respectively. The upper ends of the links 4, 4' are loosely mounted on the pins or spindles 6, 6' which project from the opposite ends of a collar 7. Links 10 are loosely mounted at their upper ends upon the pins or spindles 8, 8' and their lower ends are pivoted at a selected point to the links 4, 4' respectively. Two links 11, 11' are loosely mounted on the pins or spindles 6, 6' respectively and the two links 12, 12' are loosely mounted on the pins or spindles 8, 8' respectively. The link 11 is pivoted to the link 12 and the link 11' is pivoted to the link 12' by a bolt 13, upon which bolt there is an enlarged portion 14, which spaces one pair of the crossed links from the other. Cotter pins 15 are secured in the pins or spindles to retain the severed links thereon.

The upper ends of the links 11, 11' are loosely connected by a bolt 16 upon which bolt and between the links a roller 17 is mounted and a similar bolt 18 loosely connects the links 12, 12' and a roller 19 is similarly mounted on this bolt 18. A dished plate 20, having its opposite ends curved downwardly rests upon the rollers 17 and 19 and a coiled spring 21 is connected at its opposite ends to the lower ends of the plate 19. The spring extends under the enlarged portion 14 of the pivot bolt 13.

A central opening 22 is formed in the collar 9 through which is loosely projected a screw 23. The screw also threads through the sleeve 7. A housing 24 is suitably secured to the outer face of the collar 9 and the screw 23 is projected through it. A cone 25 is formed on the screw and cooperates with the inner wall of the housing to form a ball race for the balls 26, the balls being held in the race by a spring washer 27 that is sprung in a groove 28 formed in the wall of the housing. The forward end 29 of the screw is properly formed to receive a wrench or other device by which to rotate the screw.

A pin or rivet 30 is inserted through the screw adjacent to the rear end of the collar 9 and a washer 31 is placed between the collar and the pin.

The ball bearing forms a very efficient thrust bearing for the screw and enables easy rotation of the screw. Since the screw is loose in the collar 9 and the pin 30 prevents longitudinal movement of the collar on the screw, and the collar 7 is threaded on the screw, it is evident that when the screw is rotated the collar 7 must travel on the screw either way from or toward the collar 9 depending upon the direction of rotation of the screw.

In Fig. 1, as shown in broken lines, the screw has been rotated to the right (Fig. 3). The traveling collar 7 has moved toward the collar 9. The pivoted links therefore, move toward an erect position and elevate the plate 20, the links 10 forming a brace to steady the structure and preventing the collapse or tipping over the same.

Since the plate 20 is loosely engaged on the rollers 17 and 19 by the tension of the spring 21 it readily accommodates expanding and contracting movement of the upper ends of the upper links. At the same time an object under which the plate is engaged will seek the lowest part of the bow and hence will not disengage from the plate.

What I claim is:

1. A lifting jack comprising a base, lugs on the base, crossing links pivoted at their lower ends to the lugs respectively, two collars pivotally connected to the upper ends of the links, links pivotally connected to one of the collars and also to two of the crossing links, crossing links pivotally connected at their lower ends to the collars and being pivoted together at their crossing points, transverse rollers connecting the upper ends of the last named links, a plate contacting with the rollers, a spring resiliently retaining the plate on said rollers, a thrust bearing formed on one of the collars and a screw revolubly mounted in the latter collar and bearing and in threaded engagement with the other collar.

2. A lifting jack comprising a base, lugs on the base, crossing links pivoted at their lower ends to the lugs respectively, an internally threaded collar member pivotally connected to the upper ends of one pair of said links, a thrust bearing member having a pivotal connection to the upper ends of the other pair of said links, a pair of links pivotally connected to one of said members and to the pair of crossing links that is connected to the other member, crossing links pivotally connected at their lower ends to said links being pivoted together at their crossing points, a roller between the upper ends of each pair of the latter links, a plate slidably engaged on the rollers and a spring engaged to the opposite ends of the plate, also engaged under the pivot connecting the latter links at their crossing points, and a screw revolubly mounted in the bearing member and in threaded engagement with the collar member.

In witness whereof I have hereunto set my hand this 17th day of August 1925.

EARL W. CONRAD.